(12) United States Patent
Kast

(10) Patent No.: US 8,126,844 B2
(45) Date of Patent: *Feb. 28, 2012

(54) MULTI-THREAD REPLICATION ACROSS A NETWORK

(75) Inventor: Robert K. Kast, Succasunna, NJ (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/975,048

(22) Filed: Dec. 21, 2010

(65) Prior Publication Data

US 2011/0093855 A1     Apr. 21, 2011

Related U.S. Application Data

(63) Continuation of application No. 11/644,088, filed on Dec. 21, 2006, now Pat. No. 7,882,061.

(51) Int. Cl.
*G06F 17/00* (2006.01)
(52) U.S. Cl. ........ 707/610; 707/617; 707/618; 707/626; 707/633; 707/634; 707/643
(58) Field of Classification Search .................. 707/610, 707/617, 618, 626, 633, 634, 643
See application file for complete search history.

(56) References Cited

U.S. PATENT DOCUMENTS 7,398,285 B2 * 7/2008 Kisley ................................. 1/1
(Continued)

*Primary Examiner* — Thanh-Ha Dang
(74) *Attorney, Agent, or Firm* — Van Pelt, Yi & James LLP

(57) ABSTRACT

A replicated set of data is processed by receiving at a target, from one of a plurality of replication processing threads, a received batch of one or more non-synchronization tasks. It is determined that the received batch comprises a next batch to be performed at the target and the non-synchronization tasks included in the batch are performed in a task order.

15 Claims, 13 Drawing Sheets

U.S. PATENT DOCUMENTS

| | | | |
|---|---|---|---|
| 7,657,509 B2 * | 2/2010 | Clark et al. | 707/999.003 |
| 7,657,578 B1 * | 2/2010 | Karr et al. | 707/610 |
| 7,882,061 B1 * | 2/2011 | Kast | 707/610 |
| 2002/0169520 A1 * | 11/2002 | Lamkin et al. | 700/234 |
| 2004/0250034 A1 * | 12/2004 | Yagawa et al. | 711/162 |
| 2005/0021567 A1 * | 1/2005 | Holenstein et al. | 707/200 |
| 2007/0186001 A1 * | 8/2007 | Wayda et al. | 709/230 |
| 2007/0198789 A1 * | 8/2007 | Clark et al. | 711/162 |
| 2010/0049753 A1 * | 2/2010 | Prahlad et al. | 707/204 |
| 2010/0100529 A1 * | 4/2010 | Erofeev | 707/610 |
| 2010/0332449 A1 * | 12/2010 | Holenstein et al. | 707/615 |

* cited by examiner

MULTI-THREAD REPLICATION ACROSS A NETWORK

CROSS REFERENCE TO OTHER APPLICATIONS

This application is a continuation of co-pending U.S. patent application Ser. No. 11/644,088, entitled MULTI-THREAD REPLICATION ACROSS A NETWORK filed Dec. 21, 2006 which is incorporated herein by reference for all purposes.

BACKGROUND OF THE INVENTION

Replication applications provide a variety of useful capabilities for users. For example, a system with failover capabilities is able to switch over to a backup or redundant device in the event a primary device fails unexpectedly. In some cases, a replication application is useful even if no failure occurs. For example, a company may have multiple offices where employees in different offices access the same set of data and a replication application is used to duplicate data across offices.

Some replication applications use tasks that must be performed in a certain order. For example, some replication applications send copies of changes (e.g., made to a file or other data on a source) to a target. At the target the changes (i.e., tasks) must be performed in the same order as on the source. Techniques to improve the performance of replication applications that use tasks with a certain order would be useful.

BRIEF DESCRIPTION OF THE DRAWINGS

Various embodiments of the invention are disclosed in the following detailed description and the accompanying drawings.

DETAILED DESCRIPTION

Figure 1:
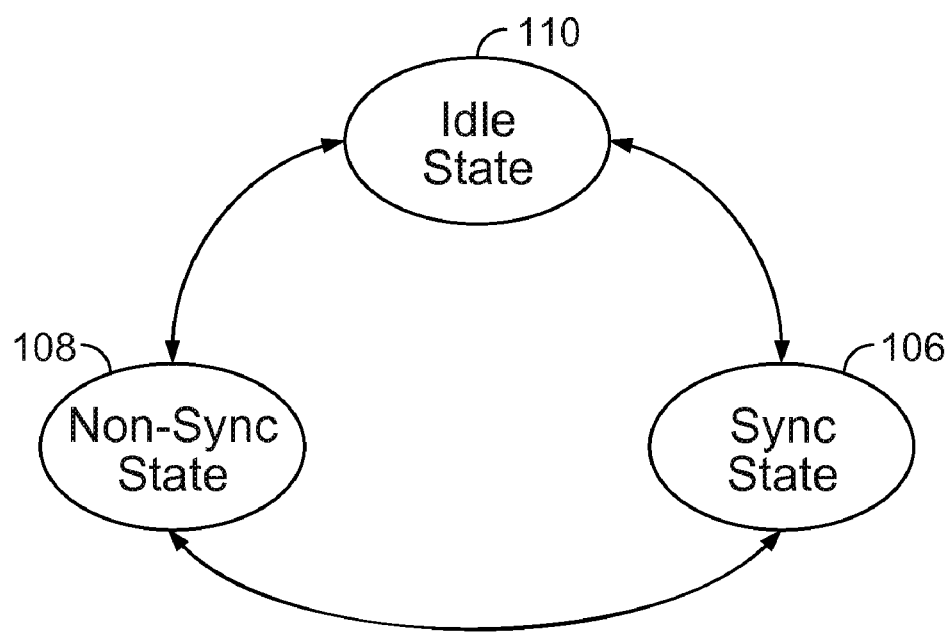
FIG. 1 is a diagram illustrating an embodiment of states associated with data replication.
Figure 1:
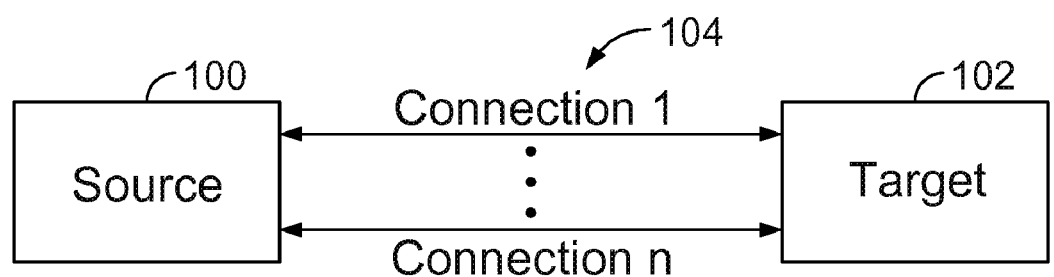

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Preserving data replication task order by forming batches of tasks for each of a plurality of data replication threads one thread at a time is disclosed. Once a thread has formed and/or been assigned a batch of tasks, the thread sends to a data replication target, via a network connection associated with the thread, the tasks included in the batch. If more than one thread has tasks remaining to be sent, e.g., from a batch assigned to and/or formed previously by the thread, the threads send tasks in parallel, each drawing from its own batch of tasks and sending its tasks across its own network connection to the data replication target. In some embodiments, the threads each may be configured to replicate data to a plurality of replication targets, in parallel if more than one thread has outstanding tasks to send, each over its own network connection to each respective data replication target. In this way, network bandwidth may be used more fully and/or efficiently by sending data replication tasks in parallel, if needed, over multiple connections to the data replication target(s). In some embodiments, order of tasks is maintained at least in part by forming batches of tasks for one thread at a time. In some embodiments, the threads form batches of tasks for themselves, for example by accessing one at a time a common source of tasks, and drawing from the common source a batch of tasks that comprise the next n tasks in task order (sequence) before relinquishing access to a next thread, if more tasks remain in the common source. In some embodiments, a batch sequence number is assigned to each batch as formed, and the replication target uses the batch sequence number(s) to determine which batch of received tasks to perform next.

FIG. 1 is a diagram illustrating an embodiment of states associated with data replication. In some embodiments, the states shown in FIG. 1 comprises states of a data replication application, process, and/or thread running on a replication source, i.e., a source of data from which data is being replicated to a replication target. In the example shown, information on source 100 is replicated on target 102. Some examples of replicated information include files, settings, configurations, databases, etc. In some embodiments, the information on source 100 that is replicated on target 102 is selected. For example, a user may select certain important files to be replicated on target 102 and other, less important files are not selected to be replicated. In some embodiments, replication of data on target 102 is used to provide failover capabilities. For example, in the event source 100 fails, target 102 may be used to provide data or functionality previously provided by source 100. In some cases, another device or system communicating with target 102 in the event of a failure is unaware that source 100 is down and/or that target 102 is being communicated with. In some embodiments, replicated data is desired or useful even without a failure. For example, a company with many offices may desire certain data to be duplicated across offices. Source 100 may be any type of device, machine, or system; some examples include storage devices, servers (e.g., web servers or file servers), etc. In some embodiments, replication is performed in (substantially) real time.

In this example, replication is file based (e.g., as opposed to volume based or block based) and replication related information that is exchanged over connections 1-n (104) is at the file level or is otherwise associated with a file. For example, to copy a file from source 100 to target 102, the file may be opened and the contents sent to target 102. In some cases, incremental changes are exchanged and the changes may be with respect to a file. In some embodiments, changes to data at the source are replicated to the target by first synchronizing the source and target and then keeping the target consistent with the source by replicating to and executing at the target file system level commands executed at the source.

Three replication states are shown in FIG. 1. During synchronization state 106, one or more files are copied (e.g., in their entirety) to target 102. For example, when a replication application is first installed, the replication application may copy files (e.g., that are selected by a user) from source 100 to target 102 via connections 1-n (104). A task, command or instruction performed during synchronization state 106 is referred to as a synchronization task. In some embodiments, a synchronization task is a task to copy a file from source 100 to target 102. Connections 1-n (104) are used to exchange data in synchronization state 106.

In non-synchronization state 108, non-synchronization tasks are sent to target 102 and are performed on target 102. Non-synchronization tasks include in some embodiments instructions, commands, or tasks associated with changes to a file (e.g., a delta or incremental piece of information). Some examples of non-synchronization tasks include writing to a file, creating/deleting a file, renaming a file, changing a file attribute, changing a file permission, etc. Information is exchanged in non-synchronization state 108 using connections 1-n (104).

In idle state 110, there are no tasks to be performed. For example, there may be little or no activity on source 100 and target 102 is up to date and reflects the current state of source 100. Some embodiments associated with these replication states are discussed in further detail below.

During synchronization state 106, the order in which tasks are performed at target 102 does not matter. For example, if two files are being copied from source 100 to target 102, it does not matter if one of the files is copied to target 102 before the other (i.e., one synchronization task is performed before another synchronization task). The order in which tasks are performed at target 102 does matter during non-synchronization state 108. For example, if a user at source 100 adds a new paragraph to a document and then edits the new paragraph, the corresponding non-synchronization tasks must be performed in that order on target 102 to maintain consistency with the state of data at the source.

To ensure that non-synchronization tasks are performed in their proper order at target 102 during non-synchronization state 108, in some embodiments, sequence numbers are used. In some embodiments, non-synchronization tasks are sent from source 100 to target 102 in batches of one or more non-synchronization tasks and batch sequence numbers are used. In some configurations, there is more than one source and/or more than one target and in some embodiments sequence numbers are tracked with respect to a given source and a given target. For example, one source/target pair may have batch sequence numbers that are incremented or otherwise managed independently of another source/target pair.

Forming batches of tasks one thread at a time is disclosed. In some embodiments, each batch includes a next set of consecutive tasks in task order drawn from a common source of tasks used to form batches for each of a plurality of threads one thread at a time. Each thread uses its own corresponding network connection to the target to send to the target the tasks in its batch. The target receives batches of tasks over multiple connections, if necessary, and once a batch has been received and determined to be the next batch in batch order, the target executes the tasks in task order before moving on to the next batch in batch order.

In some embodiments, source 100 and target 102 are located remotely from each other. In some embodiments, connections 1-n (104) are associated with a Local Area Network (LAN) and/or a Wide Area Network (WAN). In some embodiments, connections 1-n (104) include TCP/IP connections. In some embodiments, some other type of connection or protocol is used besides TCP/IP.

In some embodiments, the number of connections that comprise connections 1-n (104) is user configurable. In various embodiments, various interfaces are used to obtain a number of connections from a user. Some examples include sliders, knobs, up/down buttons, number fields/boxes, etc. In some embodiments, the number of connections is determined at least in part automatically (e.g., based on the amount of replication data, the bandwidth of a connection, etc.). In some embodiments, the number of connections is varies over time.

Although this figure and some other figures show examples in which there is a single source and a single target, in some embodiments there are multiple sources and/or multiple targets. For example, a given source may be replicated using two targets. In some embodiments, one set of information is replicated on one target and another set of information is replicated on the other target. For example, one target may have faster access times or recovery capabilities and information that must be accessed quickly (e.g., a web server for online purchases) is stored on the target with faster recovery capabilities and information that does not need to be restored as quickly (e.g., personnel files of employees) is stored on the other target. In some embodiments, the same set of information is replicated on two targets. Conversely, in some embodiments a given target is used to replicate information on two or more sources.

Figure 2:
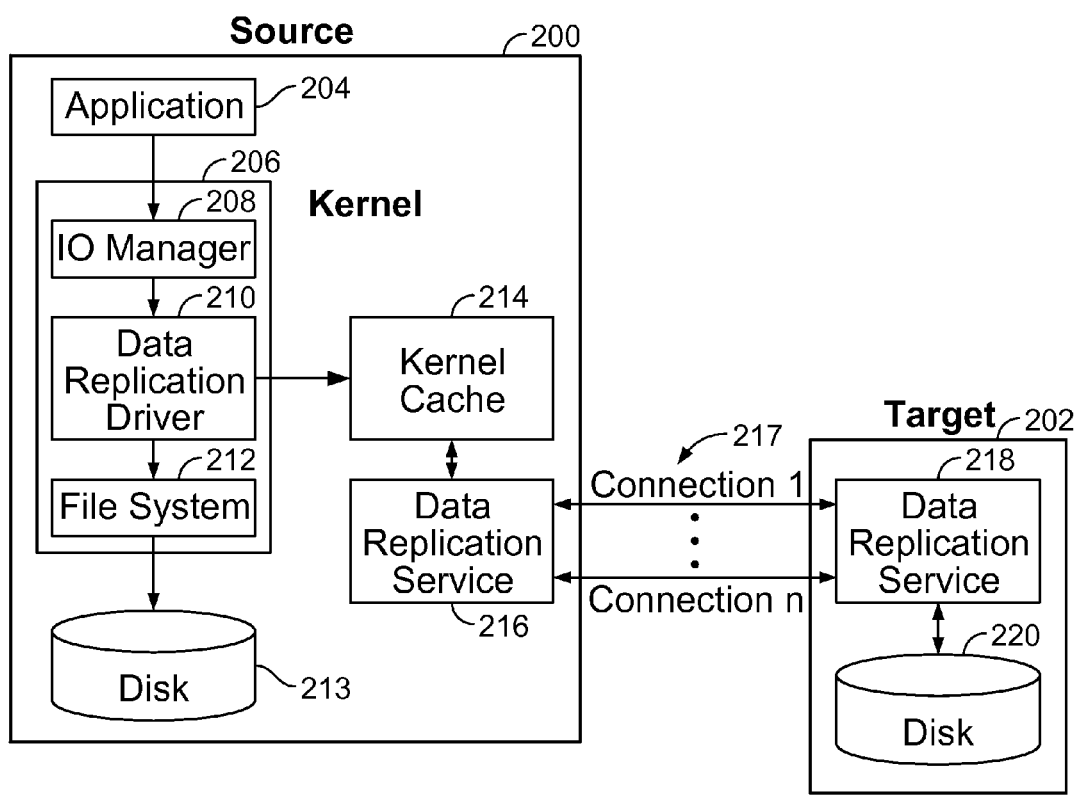
FIG. 2 is a diagram illustrating an embodiment of a source and a target.

FIG. 2 is a diagram illustrating an embodiment of a source and a target. In the example shown, source 200 and target 202 are examples of source 100 and target 102, respectively. Application 204 passes data (e.g., operations on a file, writes to a file, permissions, settings, etc.) to kernel 206. Kernel 206 includes IO manager 208, data replication driver 210, and file system 212. File system 212 accesses disk 213 at an appropriate (e.g., physical or logical) location on disk 213 to access or manipulate a file. For example, data may be written to disk 213 by file system 212 at some location.

Data replication driver 210 intercepts data passed between IO manager 208 and file system 212 and writes tasks to kernel cache 214. In some embodiments, the tasks written to kernel cache 214 are duplicates of or otherwise correspond to data intercepted by data replication driver 210. Data replication driver 210 writes both synchronization tasks and non-synchronization tasks to kernel cache 214. Data replication service 216 retrieves tasks from kernel cache 214. Via connections 1-n (217), data replication services 216 and 218 communicate so that tasks from kernel cache 214 are applied to disk 220 on target 202.

In some embodiments, data replication driver 210 and data replication services 216 and 218 are associated with a replication application. For example, if a replication application such as EMC RepliStor is installed, data replication service 218 may be installed on target 202 and data replication driver 210 and data replication service 216 may be installed on source 200.

In this example, all threads associated with a particular source are in the same state (e.g., idle state, synchronization state, or non-synchronization state) at the same time. In some cases, threads do not change states at exactly the same time. In some embodiments, state transitions occur in a manner where there is no activity during a state transition so that as far as the application is concerned or is able to discern, the state transition is instantaneous.

In some embodiments, kernel cache 214 includes a FIFO. In such embodiments, tasks are retrieved or accessed by data replication service 216 in the same order that they are written to kernel cache 214 by data replication driver 210. In various embodiments, various techniques are used to track where in kernel cache 214 one or more threads are. In some embodiments, tasks are "popped" off of kernel cache 214 and tasks that are in kernel cache 214 have not yet been claimed by a thread to be performed at target 202. In some embodiments, one or more pointers are used. In some embodiments, the threads share a single pointer; in some embodiments, each thread has its own pointer.

Figure 3:
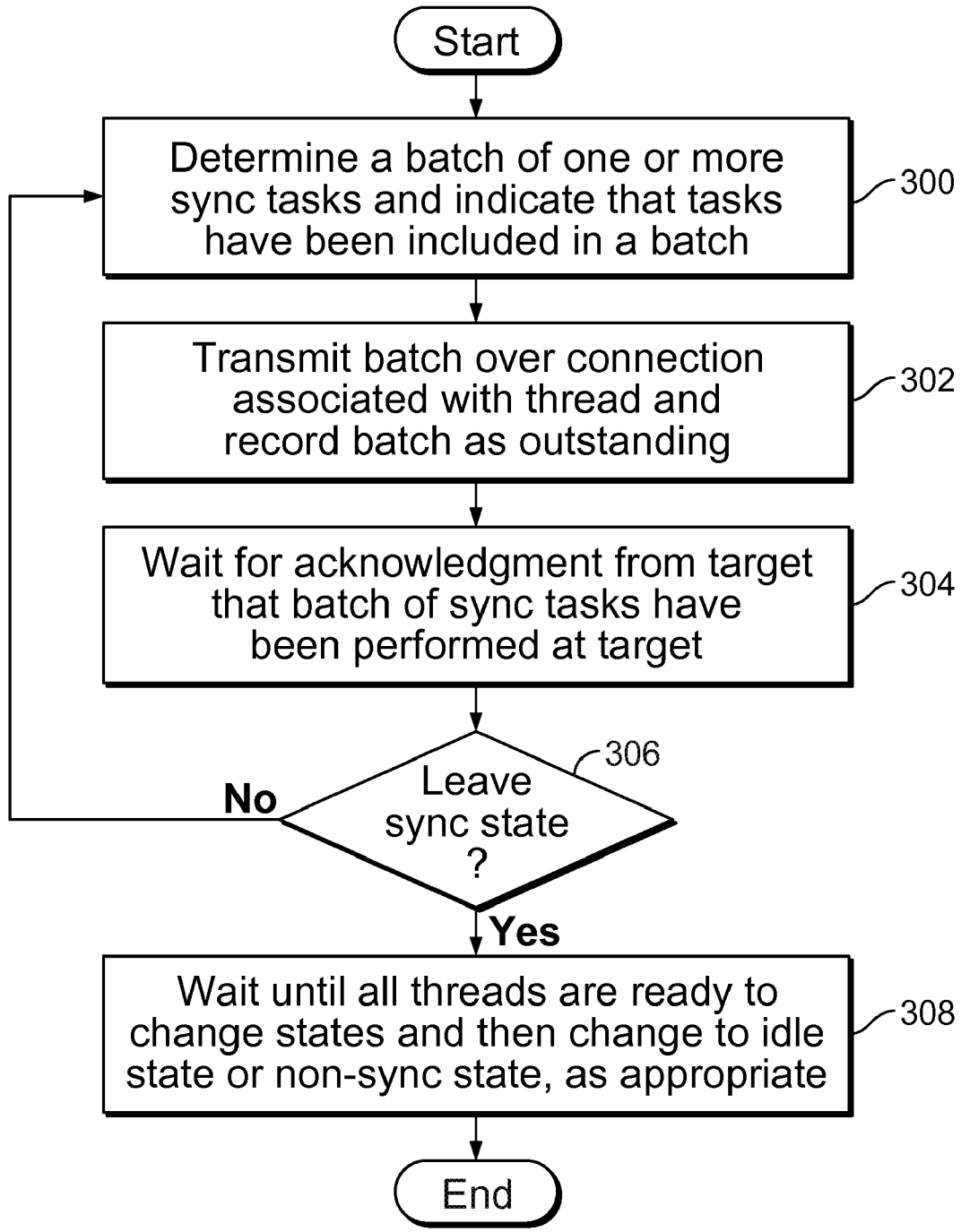
FIG. 3 is a flowchart illustrating an embodiment of processing performed at a source during a synchronization state.

FIG. 3 is a flowchart illustrating an embodiment of processing performed at a source during a synchronization state. For example, each of threads 1-n running on or otherwise associated with data replication service 216 on source 200 may perform the example process. During a synchronization state, the order in which synchronization tasks are received by and/or are processed at a target does not necessarily matter. In this example, each thread performing the example process operates independently of other threads.

At 300, a batch of one or more synchronization tasks is determined and it is indicated that the tasks have been included in a batch. In some embodiments, a thread accesses a kernel cache where tasks are stored and determines which synchronization tasks have not yet been included in a batch by another thread. In some embodiments, this is tracked using a bit associated with a given task. When the bit is 0, the task has not yet been included in a batch and when the bit is 1 the task has been included in a batch. In some embodiments, a pointer is advanced to reflect that a given task has been included in a batch. In some embodiments, one thread synchronizes file 1 (e.g., copies file 1 over to a target), another thread synchronizes file 2, etc.

In some embodiments, there is a maximum number of tasks (e.g., synchronization tasks) per batch. In some embodiments, the number of synchronization tasks in a batch is limited to one (i.e., a given thread copies a single file at a time).

At 302, a batch is transmitted over a connection associated with the thread, and the batch is recorded as outstanding. For example, if the thread is thread 1, the batch is sent over associated connection 1. In various embodiments, a batch is tracked or recorded as being outstanding using a variety of techniques. Appropriate pieces of information (such as an associated thread, an associated source, an associated target, the batch sequence number, copies of the tasks in an outstanding batch, and/or a timestamp) are recorded as needed.

There is a wait at 304 for an acknowledgement from a target that a batch of synchronization tasks has been performed at the target. An acknowledgement may be an indication or communication from a target that a particular batch of commands has been performed at a target. In various embodiments, an acknowledgement is transferred in a manner or includes appropriate pieces of information that identifies a thread to which an acknowledgement is directed and/or a batch to which the acknowledgment pertains to. In some embodiments, each thread monitors its own connection and an acknowledgment is sent on an appropriate connection. In some embodiments, an acknowledgment includes some identifying piece of information, such as a thread ID, a batch sequence number, a target ID, etc.

It is determined at 306 whether to leave a synchronization state. In some embodiments, it is determined to leave a synchronization state and enter a non-synchronization state when a non-synchronization task is encountered (e.g., in kernel cache 214). For example, if a thread encounters a non-synchronization task when determining a batch of synchronization tasks at 300, the thread may close or end the batch and send the batch to the target. In some embodiments, a change to a non-synchronization state does not occur until all other threads have caught up with the thread that first encounters the non-synchronization task. The other threads (in this example) will not overtake that thread and will wait until all threads are complete and all pointers are pointing to the non-synchronization task. At that point, all threads transition to a non-synchronization state. In some cases, it is determined at 306 that the state should change to idle at an appropriate time. For example, a thread determining a batch at 300 may determine that it has reached the end or bottom of a kernel cache.

If it is determined to remain in a synchronization state, a new batch of one or more synchronization tasks is determined at 300. Otherwise, at 308 there is a wait until all threads are ready to change states and then there is a change to an idle state or a non-synchronization state, as appropriate. In this embodiment, all threads change states simultaneously and all threads must complete processing of their synchronization tasks (i.e., no outstanding batches) before the threads leave the synchronization state. A given thread in various embodiments signals its readiness to make a state change as appropriate (e.g., using an appropriate sub-state, register, flag, pointer position, etc.).

Figure 4:
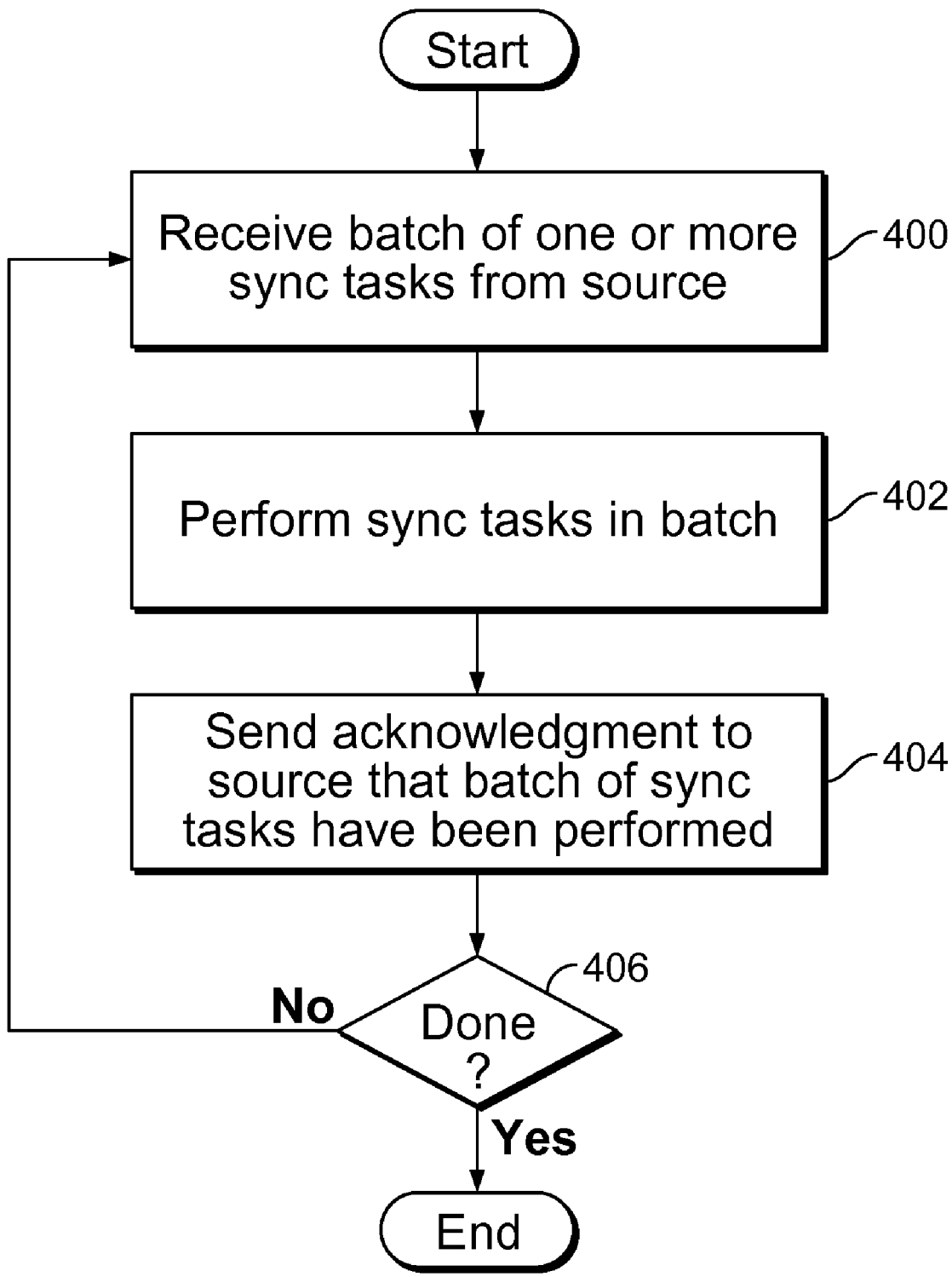
FIG. 4 is a flowchart illustrating an embodiment of processing performed at a target during a synchronization state.

FIG. 4 is a flowchart illustrating an embodiment of processing performed at a target during a synchronization state.

In the example shown, data replication service 218 on target 202 may perform the process shown. During a synchronization state, the order in which tasks are performed at a target does not necessarily matter.

At 400, a batch of one or more synchronization tasks is received from a source. At 402, synchronization tasks in a batch are performed. For example, synchronization tasks may be associated with copying file(s) or other data from a source to a target. In some embodiments, batches of synchronization tasks are not necessarily processed in a prescribed or received order.

In some embodiments, synchronization tasks within a given batch are performed in order. Some systems are configured to generate batches of one or more synchronization tasks so that the tasks in a batch are all associated with a single file. If a file is large, there may be multiple batches containing data to synchronize that one file. These operations are performed over a single thread and therefore are performed on the target in the same order they were specified on the source.

An acknowledgment is sent to a source that a batch of synchronization tasks has been performed at 404. In some embodiments, an acknowledgement is sent via a connection corresponding to a thread associated with the batch. For example, if the batch is associated with thread 2, an acknowledgement in some embodiments is sent on connection 2.

It is determined at 406 if a process is done. In some embodiments, the process ends when the state is no longer a synchronization state. In some embodiments, the example process cannot end unless all batches received at a target have been performed and acknowledged. For example, some targets are configured to include a buffer to store received tasks until processing resources become available. A determination at 406 in some embodiments includes determining if such a buffer is empty. If a process is not done at 406, a new batch is received at 400. Alternatively, in some embodiments, a stored batch of tasks is retrieved from a buffer.

In various embodiments, various pieces of information are exchanged between a source and a target. In some embodiments, information in addition to or as an alternative to some of the examples described in FIGS. 3 and/or 4 is exchanged.

Figure 5:
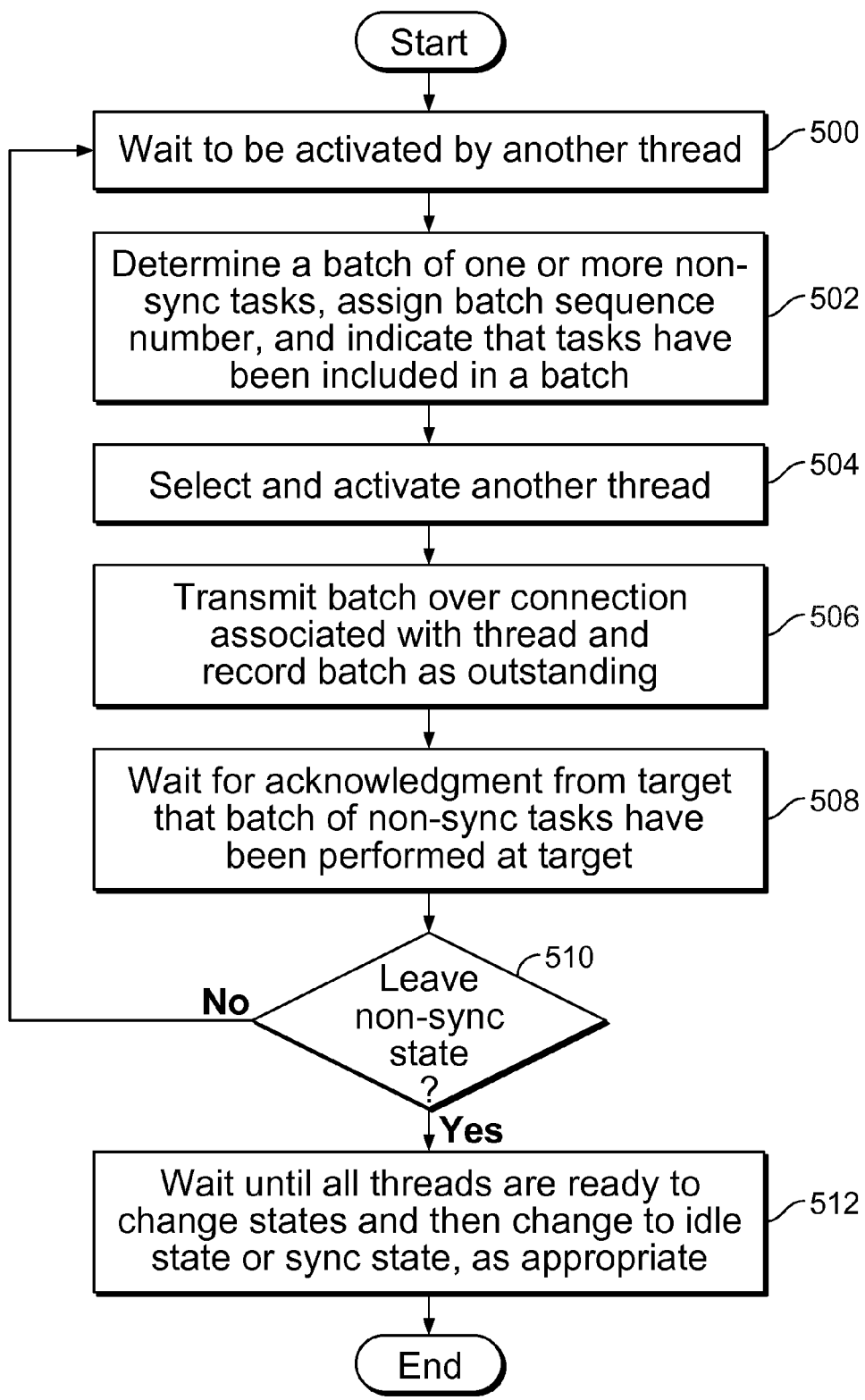
FIG. 5 is a flowchart illustrating an embodiment of processing performed at a source during a non-synchronization state.

FIG. 5 is a flowchart illustrating an embodiment of processing performed at a source during a non-synchronization state. For example, each of threads 1-n associated with data replication service 216 on source 200 may perform the example process. During a non-synchronization state, it is important to perform non-synchronization tasks on a target in the same order as on the source. In some embodiments, some steps are the same as or similar to corresponding steps in a synchronization mode.

At 500, there is a wait to be activated by another thread. In this embodiment, only one thread generates a batch of one or more non-synchronization tasks at a time. For example, only one thread accesses a kernel cache at a time during a non-synchronization state in some embodiments. At 502, a batch of one or more non-synchronization tasks is determined, a batch sequence number is assigned, and it is indicated that the tasks have been included in a batch. In this example, only one thread accesses a kernel cache at a time to generate batches of non-synchronization tasks. As a result, in this embodiment a batch of non-synchronization tasks are consecutive tasks (e.g., within a kernel cache).

In some scenarios, determining batches of one or more non-synchronization tasks at 502 to be consecutive tasks is attractive or otherwise desirable. For example, if a connection between a source and target were to go down, a thread may be able to determine at what point (e.g., at what command in a kernel cache) to restart sending commands. The expected behavior is that if a connection drops, file operations will continue to queue (but not be sent). When the connection is re-established, it will resume sending where it left off. If each batch had a list of tasks that were NOT consecutive, the target could figure it all out and apply the tasks in the correct order, but if the connection dropped the source would have no idea where to reset its pointers to so it would resume without losing anything or sending something twice.

In some embodiments, a batch is determined or otherwise grouped at 502 so that it can be resent if so needed. This is attractive in some applications or scenarios, for example if a connection goes down and an acknowledgement was not received for a particular batch. In such as scenario, that batch is resent in some embodiments (e.g., because a source doesn't know if the target had processed the batch). To accommodate a potential resend of a batch, in some embodiments certain types of tasks or commands are the only task in a batch when determined or grouped at 502. For example, if the task is "rename file" or "delete file," in some embodiments the batch will contain only that task. Suppose, for example, the task "RENAME b.txt-->c.txt" and "RENAME a.txt-->b.txt" are in a kernel cache. If those two tasks were included in the same batch and that batch is sent and performed at the target but the connection goes down before the acknowledgment is received by the source, that batch will be sent again. As a result of the first execution of the batch in this example, c.txt is the old b.txt and b.txt is the old a.txt. If the batch is resent and executed a second time, corrupted data at the target would result.

Another thread is selected and activated at 504. In some embodiments, a given thread has at most one outstanding batch of non-synchronization tasks, and a thread making a selection at 504 determines which threads have completed processing and do not have an outstanding batch of non-synchronization tasks. In some embodiments, all threads are busy and the currently active thread waits for and activates the first thread that completes its processing.

In some embodiments, threads are numbered and if there are two or more eligible threads, the one with the lowest/highest number is selected. In such embodiments, some threads may not be used at all during a non-synchronization state. For example, if there are three threads but threads 1 and 2 are able to have their outstanding batches acknowledged quickly (e.g., because of a fast transfer time across a connection and/or fast processing at a target), threads 1 and 2 may do all of the processing and thread 3 may not necessarily be activated at 504. Alternatively, in some embodiments, threads are selected and activated in round robin manner. For example, if thread 2 is selecting the next thread to activate and threads 1 and 3 are eligible, thread 3 would be selected because it is thread 3's turn.

A batch is transmitted over a connection associated with a thread and the batch is recorded as outstanding at 506. At 508 there is a wait for an acknowledgement from a target that a batch of non-synchronization tasks has been performed at a target. In some embodiments, although only a single thread is generates a batch at a time, threads are able to simultaneously communicate over their respective connections. One connection may, for example, be used to send an acknowledgement while at the same time another connection is used to exchange a batch of tasks.

It is determined at 510 whether to leave a non-synchronization state. In some embodiments, all outstanding batches must be acknowledged before changing states (e.g., simultaneously). In some cases, there are no tasks to be processed (e.g., a kernel cache is empty) and it is determined to change from a non-synchronization state to an idle state. If it is determined to leave a non-synchronization state, at 512 there is a wait until all threads are ready to change states and then there is a change to an idle state or a synchronization state, as appropriate. Otherwise, there is another wait to be activated by a thread at 500.

In some embodiments, if a synchronization task is encountered (e.g., when accessing a kernel cache to generate a batch at 502) it is determined to change from a non-synchronization state to a synchronization state. The actual state change may occur later at an appropriate time. In some embodiments, batches are homogeneous and a synchronization task is not included in a batch of one or more non-synchronization tasks. In some embodiments, it is determined to leave a non-synchronization state because of an indication or flag from another thread.

Figure 6:
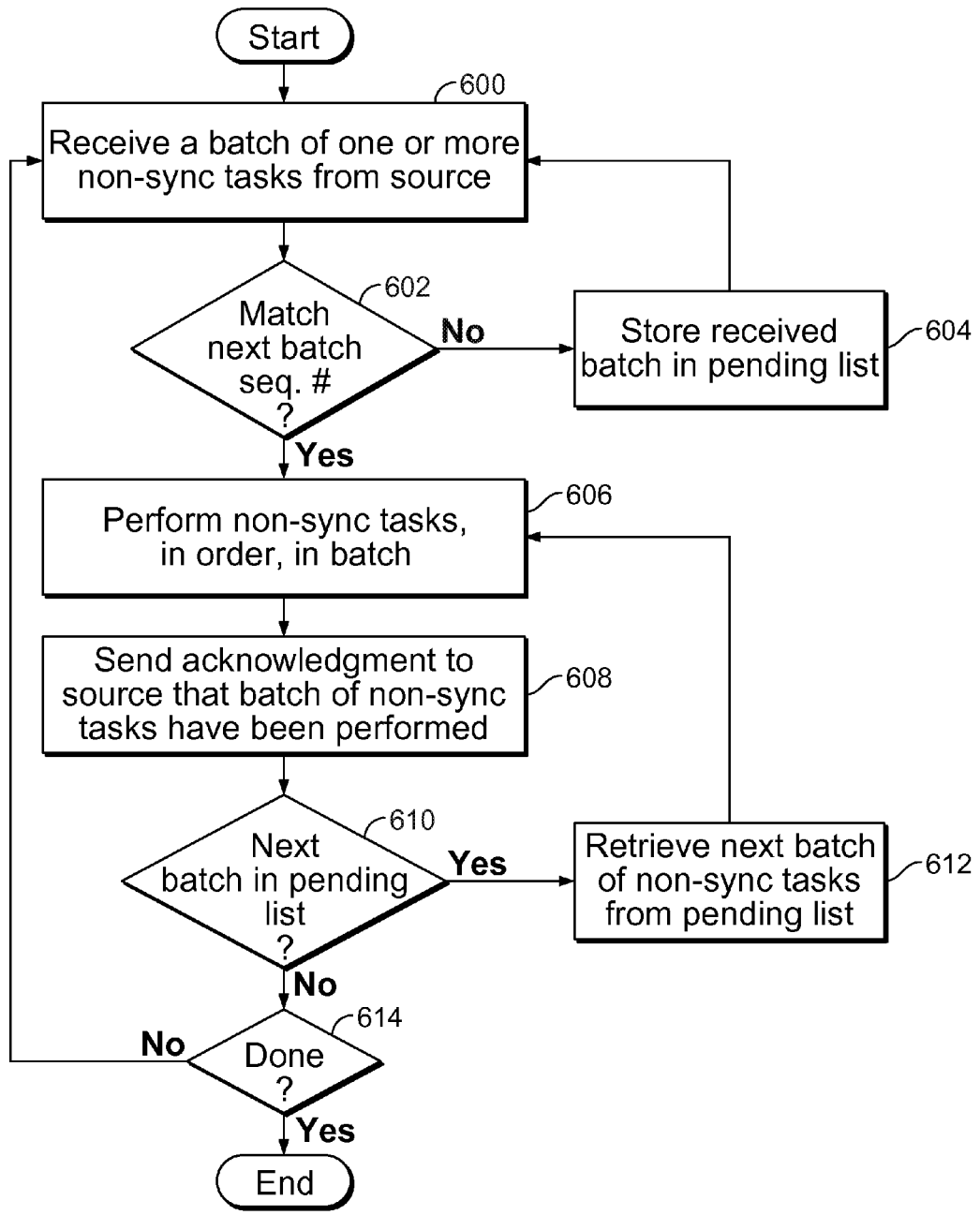
FIG. 6 is a flowchart illustrating an embodiment of processing performed at a target during a non-synchronization state.

FIG. 6 is a flowchart illustrating an embodiment of processing performed at a target during a non-synchronization state. For example, data replication service 218 on target 202 may perform the example process shown. In some embodiments, some steps are the same as or similar to corresponding steps in a synchronization mode. For example, sending an acknowledgement at 608 in a non-synchronization mode may be the same or similar to in a synchronization mode.

At 600, a batch of one or more non-synchronization tasks is received from a source. It is determined at 602 if it matches a next batch sequence number. In this example, each batch is assigned a batch sequence number, and the target processes batches based on batch sequence number (e.g., in ascending order).

If it does not match the next batch sequence number, the received batch is stored in a pending list at 604. Otherwise, at 606 non-synchronization tasks in a batch are performed in order. For example, a batch may have three non-synchronization tasks and the three tasks are performed in order.

At 608, an acknowledgment is sent to a source that a batch of non-synchronization tasks has been performed. It is determined at 610 if a next batch is in a pending list. For example, batches may have been received out of order and the batch with the next batch sequence number is stored in a pending list. If so, a next batch of non-synchronization tasks is retrieved from a pending list at 612. Otherwise, it is determined at 614 if a process is done. In some embodiments, a process does not end if there are received batches in a pending list. If it does not end, a new batch is received at 600.

In some embodiments, an application or user interface displays performance or usage information to a user (e.g., if a user interface is so configured or such information is accessed by a user). In some cases, each thread completes its processing quickly (e.g., because a transfer time across a connection is relatively fast and/or processing at a source is relatively fast). In such cases, a user may observe via a performance or usage display that only some of the connections are needed and accordingly reduces the number of connections. In other scenarios, a user is able to observe that all connections are being used and may, if so desired, increase the number of connections.

Figure 7:
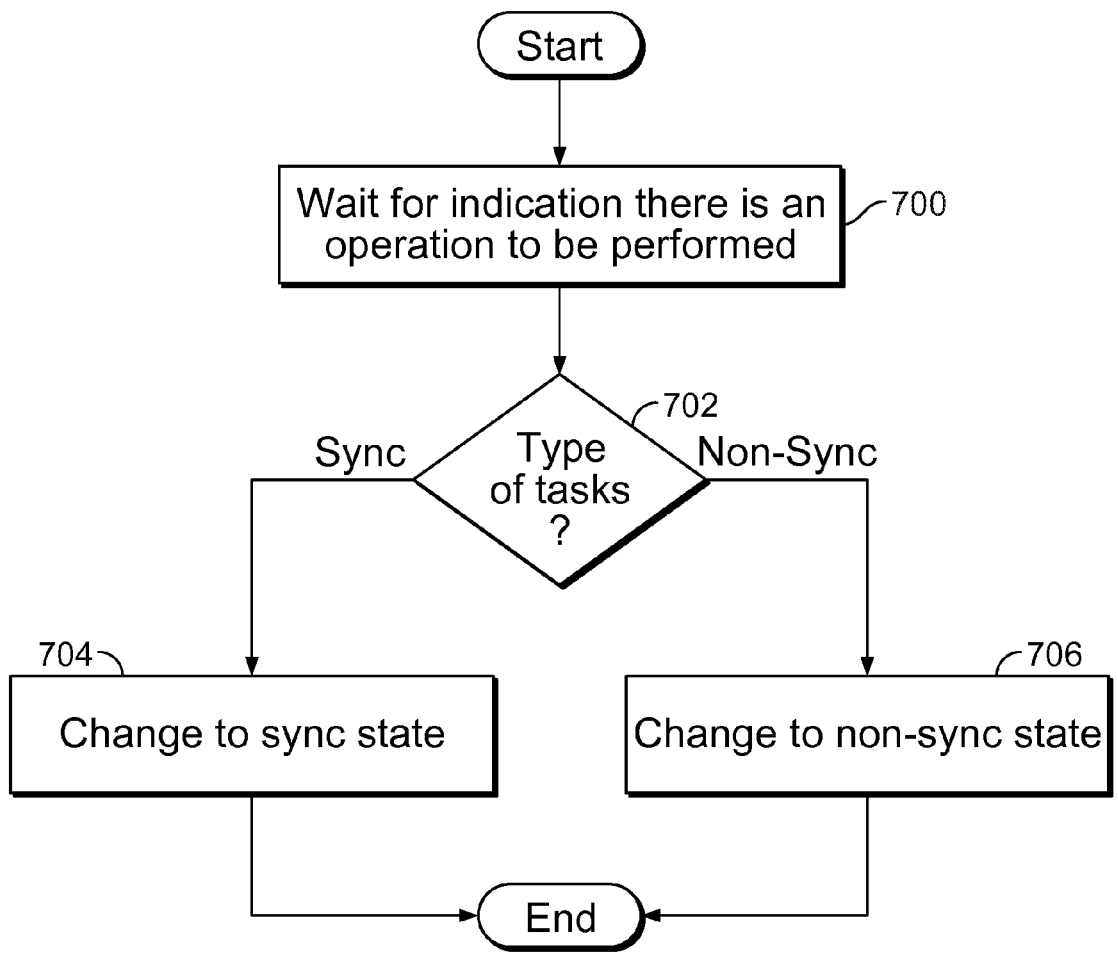
FIG. 7 is a flowchart illustrating an embodiment of processing performed at a source during an idle state.

FIG. 7 is a flowchart illustrating an embodiment of processing performed at a source during an idle state. An idle state may occur, for example, because there is little or no activity (i.e., changes) at a source. Referring to the example of FIG. 2, a process may be in an idle state if kernel cache 214 is empty and there are no outstanding batches of tasks.

At 700, there is a wait for an indication there is an operation to be performed. Referring back to FIG. 2 for example, data replication service 216 may receive an indication or detect that kernel cache 214 has one or more new tasks in it.

The type of task is determined at 702. In some embodiments, there is more than one task and the type of the first or earliest task (e.g., in a kernel cache) is determined. If it is a synchronization task, at 704 there is a change to a synchronization state. Synchronization processing (one example of which is shown in FIG. 3) is performed at the source. If it is a non-synchronization task, at 706 there is a change to a non-synchronization state. During a non-synchronization state, the order in which tasks are performed at a target matches the order in which they are performed at a corresponding source; one example of processing during a non-synchronization state at a source is shown in FIG. 5.

Figure 8A:
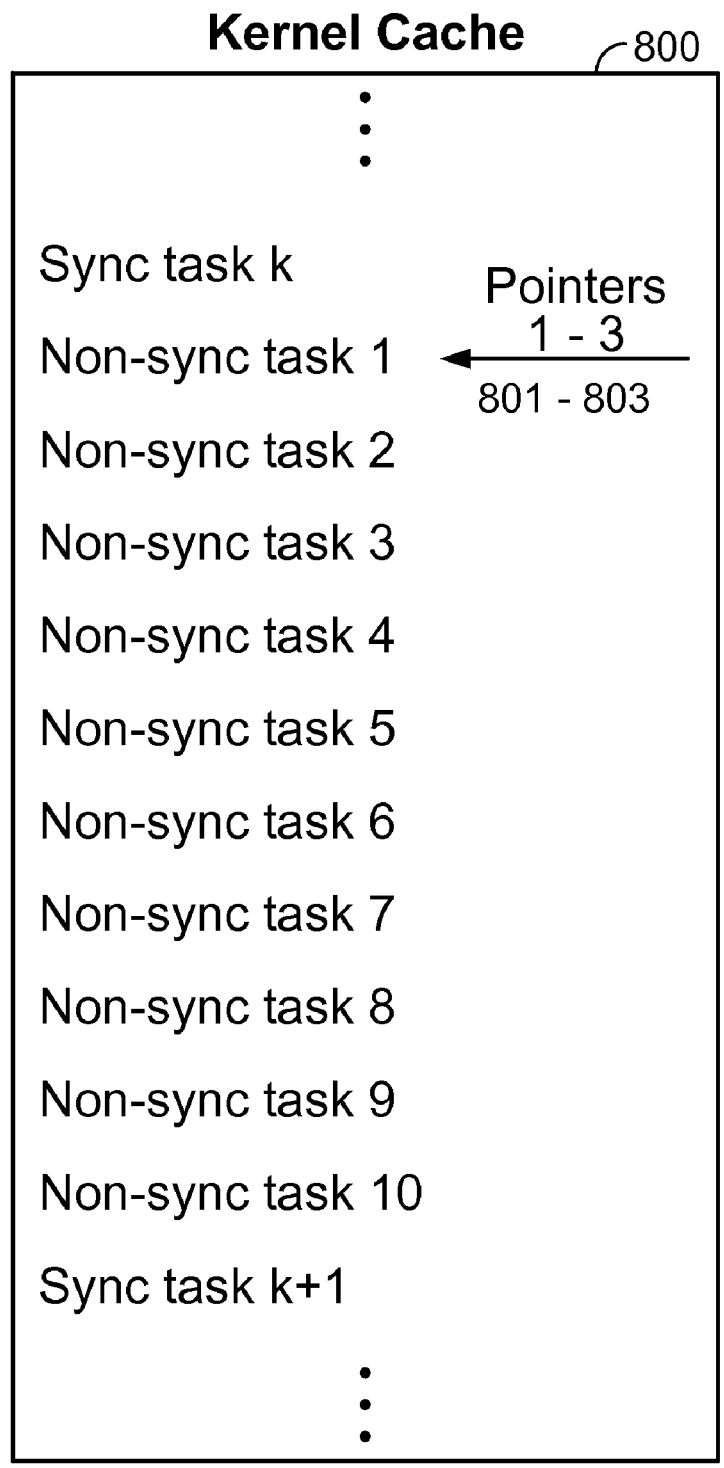
FIG. 8A is a diagram illustrating an example of non-synchronization tasks in a kernel cache before being grouped into batches.

FIG. 8A is a diagram illustrating an example of non-synchronization tasks in a kernel cache before being grouped into batches. In the example shown, there are three connections between an associated source and target and threads 1-3 are respectively associated with connections 1-3 (not shown). Each thread has associated with it a pointer to track its location or position within kernel cache 800. At the point in time shown, pointers 1-3 (801-803) are pointing to non-synchronization task 1, which is the first non-synchronization task in a group of ten consecutive non-synchronization tasks.

In this example, one thread access kernel cache 800 at a time to generate or gather a batch of one or more non-synchronization tasks. In this embodiment, a thread has at most one outstanding batch. At the point in time shown, none of the threads have an outstanding batch and all threads are eligible to generate a batch. Thread 1 is the first thread that generates a batch of one or more non-synchronization tasks in this example.

Figure 8B:
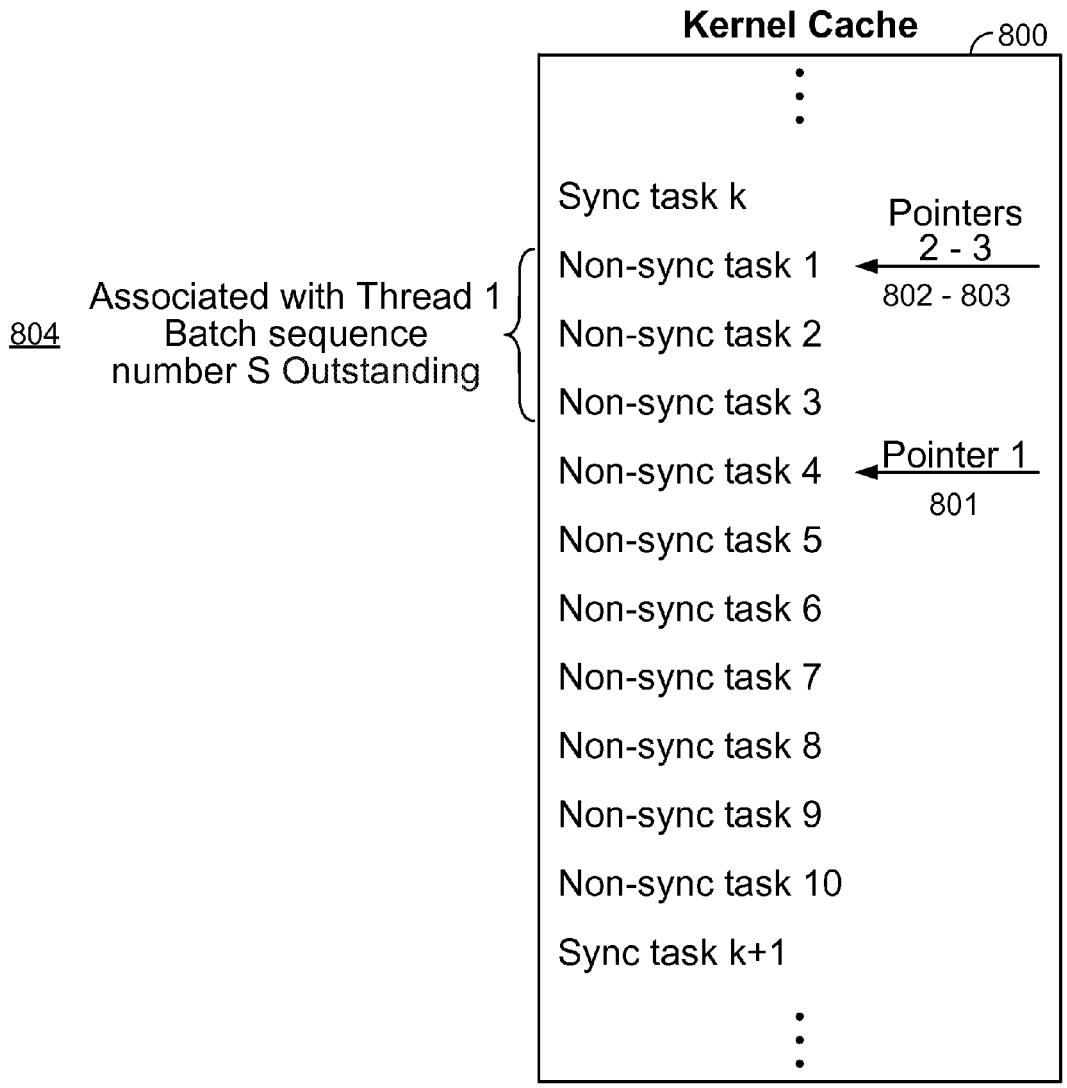
FIG. 8B is a diagram illustrating an example of a kernel cache after a first batch of non-synchronization tasks is gathered.

FIG. 8B is a diagram illustrating an example of a kernel cache after a first batch of non-synchronization tasks is gathered. In the example shown, thread 1 has gathered batch 804 which includes non-synchronization tasks 1-3. In this example, there is a maximum of three tasks per batch. In some embodiments, some other maximum is used. Batch 804 is assigned a batch sequence number of S and batch 804 is transferred to a target over connection 1, which is associated with thread 1, and its status is outstanding. Pointer 1 (801) is advanced and points to non-synchronization task 4, the first tasks after batch 804. In some embodiments, a pointer points to the last task included in a group (e.g., non-synchronization task 3).

Thread 1 selects the next thread to activate. In some embodiments, selection and/or activation of the next thread is performed prior to transferring a batch to a target. In this example, threads 2 and 3 are eligible and thread 2 is selected by thread 1 to be the next thread to generate a batch of non-synchronization tasks.

In some embodiments, when thread 2 is activated, it compares pointers 1-3 (801-803) and determines which pointer is the furthest advanced (i.e., pointer 1 (801)). Thread 2 begins generating or gathering a group beginning at pointer 1 (801).

Figure 8C:
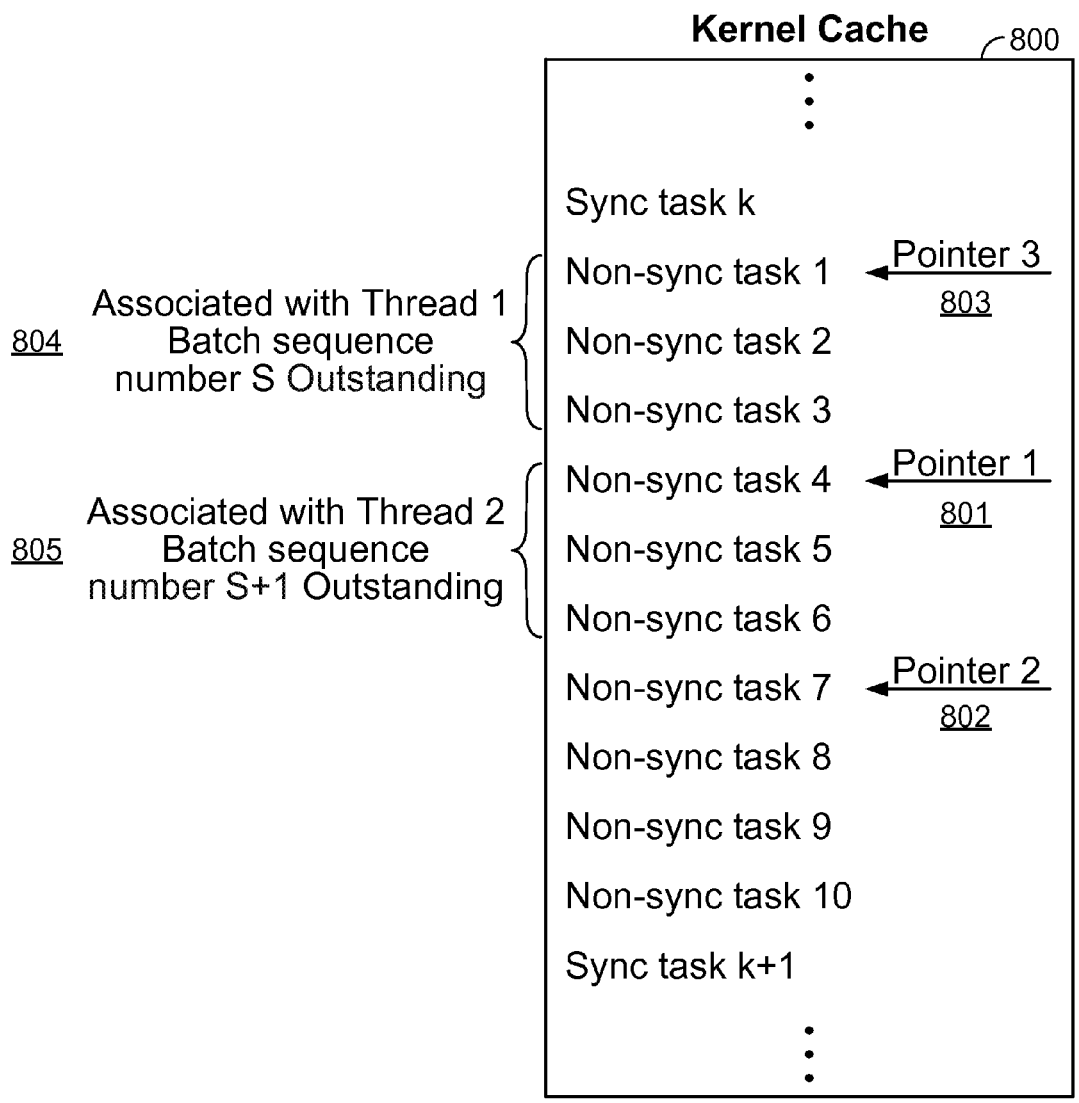
FIG. 8C is a diagram illustrating an example of a kernel cache after a second batch of non-synchronization tasks is gathered.

FIG. 8C is a diagram illustrating an example of a kernel cache after a second batch of non-synchronization tasks is gathered. In the example shown, thread 2 has gathered batch 805 and it includes non-synchronization tasks 4-6. Batch 805 is assigned a sequence number of S+1 and is transferred to a target via connection 2, which is associated with thread 2. Pointer 2 (802) is moved and points to non-synchronization task 7, the first task after batch 805.

Batch 804 at this point in time has not yet been acknowledged by a target and is still outstanding. Since batch 804 is outstanding, thread 3 is the only eligible thread (since in this embodiment each thread has at most one outstanding batch) and thread 3 is selected and activated by thread 2.

Figure 8D:
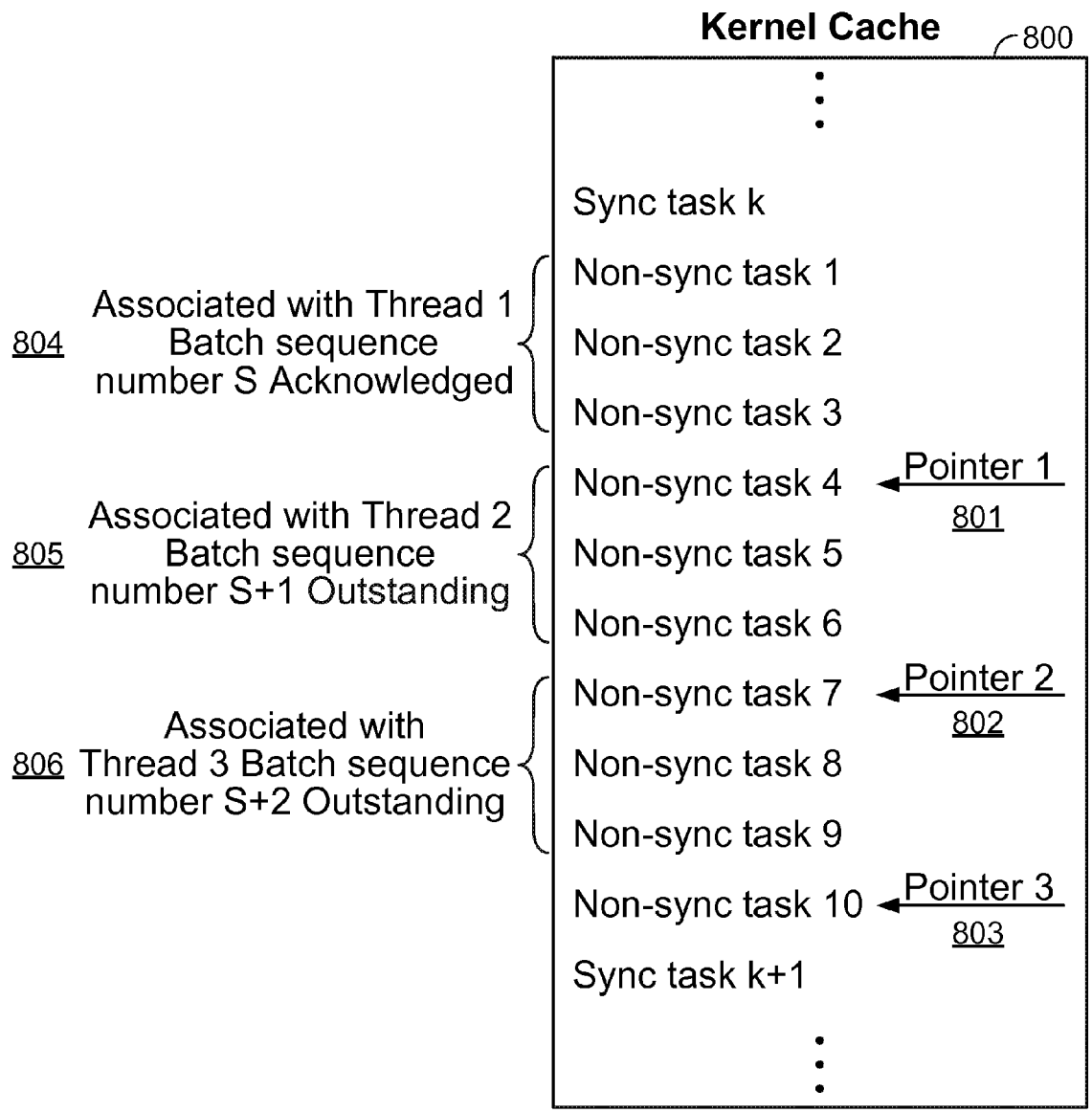
FIG. 8D is a diagram illustrating an example of a kernel cache after a third batch of non-synchronization tasks is gathered.

FIG. 8D is a diagram illustrating an example of a kernel cache after a third batch of non-synchronization tasks is gathered. In the example shown, thread 3 has gathered batch 806 and it includes non-synchronization tasks 7-9. Batch 806 is assigned a batch sequence number of S+2 and is transferred to a target via connection 3. Pointer 3 (803) is moved to non-synchronization task 10, reflecting the generation of batch 806 by thread 3.

An acknowledgment has been received for batch 804 and it is no longer outstanding; thread 1 is thus eligible to be the next thread to gather a batch. Batch 805 has not yet been acknowledged and thread 2 is not eligible. As such, thread 3 selects thread 1 as the next thread to generate a batch.

Figure 8E:
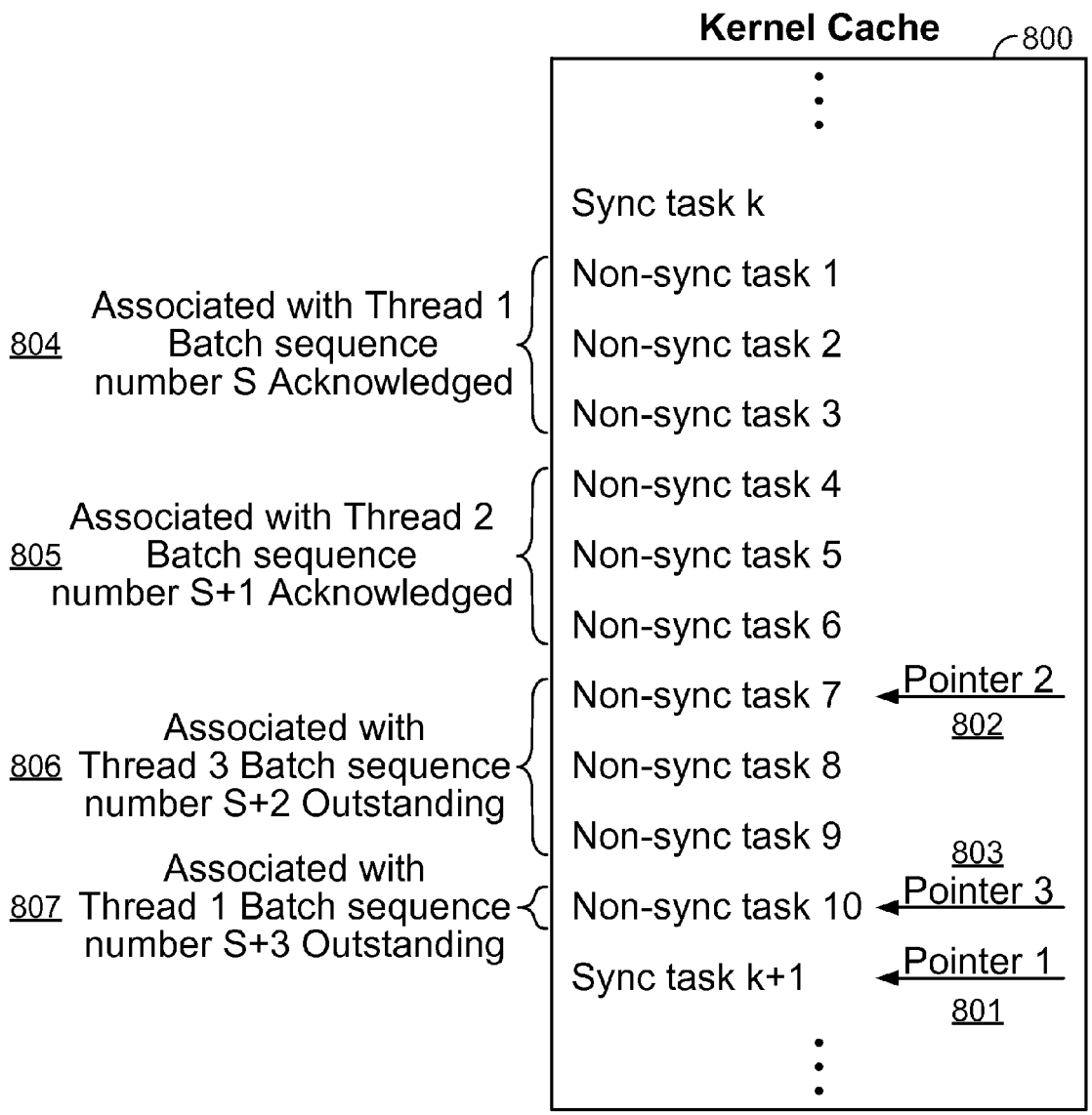
FIG. 8E is a diagram illustrating an example of a kernel cache after a fourth batch of non-synchronization tasks is gathered.

FIG. 8E is a diagram illustrating an example of a kernel cache after a fourth batch of non-synchronization tasks is gathered. In the example shown, thread 1 has generated batch 807. In the process of gathering batch 807, thread 1 encounters synchronization task k+1. In this example, when a given thread (e.g., thread 1) encounters a synchronization task in a non-synchronization mode, the batch being generated (e.g., batch 807) does not include the synchronization task.

In some embodiments, thread 1 indicates to the other threads that a synchronization task has been encountered and a state change will occur once all of the outstanding batches are acknowledged. For example, at the point in time shown here, batches 806 and 807 are outstanding and the state will not change from a non-synchronization state to a synchronization state until both batches are acknowledged. In some embodiments, thread 1 indicates a pending state change by setting a sub-state to an appropriate sub-state. In some embodiments, the other threads determine a pending state change or detect a synchronization task for themselves. For example, when threads 2 and 3 are next activated at their respective turns, each thread on its own may encounter synchronization task k+1 and determine that the state should change.

In some embodiments, there is a clean up process to remove or delete tasks from kernel cache 800 when the tasks are no longer needed. In various embodiments, a task is deleted from a kernel cache as various events occur. In some embodiments a clean up process trails the last pointer in a kernel cache and removes or otherwise deletes tasks exposed by the last pointer. For example, at the point in time shown in FIG. 8A, synchronization task k may be deleted by a clean up process. At the point in time shown in FIG. 8D, pointer 1 (801) is the last pointer and non-synchronization tasks 1-3 are deleted from kernel cache 800. In some embodiments, a task is removed from a kernel cache when a batch that includes the task is acknowledged.

Figure 9:
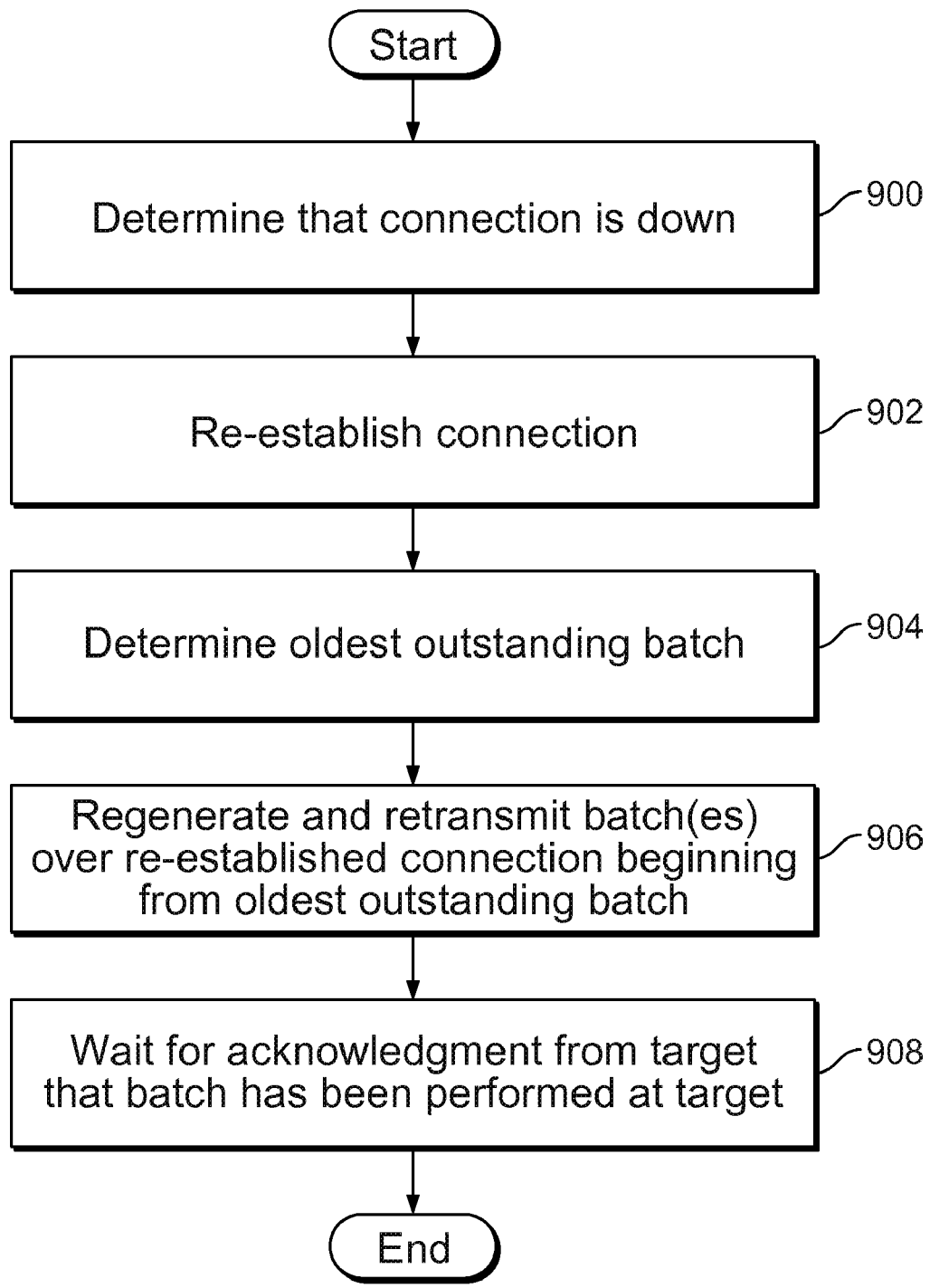
FIG. 9 is a flowchart illustrating an embodiment of error detection and handling.

FIG. 9 is a flowchart illustrating an embodiment of error detection and handling. In the example shown, the process is performed at a source. In some embodiments, the example process is used if a connection goes down during a non-synchronization state.

At 900, it is determined that a connection is down. Any appropriate technique may be used to determine or detect that a connection is down (e.g., a timeout expires, a target is unresponsive, etc.). A connection is reestablished at 902. In some embodiments, batch sequence numbers are reset when a connection is reestablished.

At 904, the oldest outstanding batch is determined. Batch(es) are regenerated and retransmitted over the reestablished connection beginning from the oldest outstanding batch at 906. In some systems, if there is a failure then there is at least some loss of information associated with outstanding batches. To regenerate or otherwise regroup tasks into batches at 906, in some embodiments all threads go to the idle state and all pointers are set to the oldest unacknowledged batch (i.e., the first task of the batch). A state change to leave the idle state then occurs (e.g., a non-synchronization state is entered). In some cases, a batch regenerated at 906 is not necessarily the same batch that was originally generated. For example, in embodiments where reestablishing the connection causes the batch sequence number to reset, at a minimum the batch sequence number is different.

At 1006 there is a wait for an acknowledgement from a target that a batch has been performed at a target. Until an acknowledgment is received at 1006, the retransmitted batch is still outstanding.

In some embodiments, error detection and/or handling is performed at a target (e.g., as an alternative to or in addition to processing at a source). For example, during a non-synchronization state a process at a target may use batch sequence numbers to perform batches of non-synchronization tasks in a certain order. In some embodiments, if a target receives a batch that is out of order, a timer is started. If the timer expires before the expected batch is received, an error is registered. In some embodiments, an error is detected using some other technique. A process at a target may handle a detected error in any appropriate manner. In some embodiments, if an error occurs (e.g., an out of sequence error) one or more connections are brought down by the target, causing a process at a source to detect the down connection and perform an error or failure process (e.g., backing up to the oldest unacknowledged batch, reconnecting, and resending).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a replicated set of data, comprising:
   receiving at a target, from one of a plurality of replication processing threads, a received batch of one or more non-synchronization tasks, wherein changes made to a set of data by a plurality of non-synchronization tasks are dependent on an order in which the plurality of non-synchronization tasks are performed, and wherein the set of data is replicated from a source to the target, and wherein the one or more non-synchronization tasks are selected as a batch from the plurality of non-synchronization tasks based at least in part on the order;
   using a processor to determine that the received batch comprises a next batch to be performed at the target; and
   performing in a task order the non-synchronization tasks included in the batch.

2. The method as recited in claim 1, further comprising storing the received batch if the received batch does not comprise the next batch to be performed at the target.

3. The method as recited in claim 1, further comprising sending to the one of the plurality of replication processing threads from which the batch is received an indication that the batch has been performed at the target.

4. The method as recited in claim 1, wherein batches are received from a plurality of sources and determining includes determining with respect to a corresponding one of the plurality of sources from which a batch is received.

5. The method as recited in claim 1, wherein determining includes using a batch sequence number.

6. A system for processing a replicated set of data, comprising:
   a receiver configured to receive at a target, from one of a plurality of replication processing threads, a received batch of one or more non-synchronization tasks, wherein changes made to a set of data by a plurality of non-synchronization tasks are dependent on an order in which the plurality of non-synchronization tasks are performed, and wherein the set of data is replicated from a source to the target, and wherein the one or more non-synchronization tasks are selected as a batch from the plurality of non-synchronization tasks based at least in part on the order; and a processor configured to:
determine that the received batch comprises a next batch to be performed at the target; and
perform in a task order the non-synchronization tasks included in the batch.

7. The system as recited in claim 6, further comprising storage configured to store the received batch if the received batch does not comprise the next batch to be performed at the target.

8. The system as recited in claim 6, further comprising a transmitter configured to send to the one of the plurality of replication processing threads from which the batch is received an indication that the batch has been performed at the target.

9. The system as recited in claim 6, wherein batches are received from a plurality of sources and determining includes determining with respect to a corresponding one of the plurality of sources from which a batch is received.

10. The system as recited in claim 6, wherein the processor is configured to determine using a batch sequence number.

11. A computer program product for processing a replicated set of data, the computer program product being embodied in a non-transitory computer readable storage medium and comprising computer instructions for:

receiving at a target, from one of a plurality of replication processing threads, a received batch of one or more non-synchronization tasks, wherein changes made to a set of data by a plurality of non-synchronization tasks are dependent on an order in which the plurality of non-synchronization tasks are performed, and wherein the set of data is replicated from a source to the target, and wherein the one or more non-synchronization tasks are selected as a batch from the plurality of non-synchronization tasks based at least in part on the order determining that the received batch comprises a next batch to be performed at the target; and performing in a task order the non-synchronization tasks included in the batch.

12. The computer program product as recited in claim 11, the computer program product further comprising computer instructions for storing the received batch if the received batch does not comprise the next batch to be performed at the target.

13. The computer program product as recited in claim 11, the computer program product further comprising computer instructions for sending to the one of the plurality of replication processing threads from which the batch is received an indication that the batch has been performed at the target.

14. The computer program product as recited in claim 11, wherein batches are received from a plurality of sources and the computer instructions for determining include computer instructions for determining with respect to a corresponding one of the plurality of sources from which a batch is received.

15. The computer program product as recited in claim 11, wherein the computer instructions for determining include computer instructions for using a batch sequence number.

* * * * *